United States Patent
Alkov et al.

(10) Patent No.: US 10,956,472 B2
(45) Date of Patent: *Mar. 23, 2021

(54) DYNAMIC LOAD BALANCING BASED ON QUESTION DIFFICULTY

(71) Applicant: International Business Machines Corporation, Armonk, NY (US)

(72) Inventors: Christopher S. Alkov, Austin, TX (US); Suzanne L. Estrada, Boca Raton, FL (US); Peter F. Haggar, Raleigh, NC (US); Kevin B. Haverlock, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

This patent is subject to a terminal disclaimer.

(21) Appl. No.: 14/969,549

(22) Filed: Dec. 15, 2015

(65) Prior Publication Data

US 2016/0110448 A1    Apr. 21, 2016

Related U.S. Application Data

(63) Continuation of application No. 14/067,697, filed on Oct. 30, 2013, now Pat. No. 9,251,469.

(51) Int. Cl.
*G06N 5/02* (2006.01)
*G06F 16/335* (2019.01)
(Continued)

(52) U.S. Cl.
CPC .......... *G06F 16/335* (2019.01); *G06F 16/334* (2019.01); *G06F 16/3329* (2019.01);
(Continued)

(58) Field of Classification Search
CPC .. G06F 16/335; G06F 16/334; G06F 17/3329; G06N 20/00; G06N 5/022; G06N 5/043
See application file for complete search history.

(56) References Cited

U.S. PATENT DOCUMENTS 8,751,559 B2    6/2014   Richardson et al.
8,914,517 B1   12/2014   Shpilyuck et al.
(Continued)

OTHER PUBLICATIONS

Liu, Jing, et al. "Question difficulty estimation in community question answering services." Proceedings of the 2013 Conference on Empirical Methods in Natural Language Processing. 2013. (Year: 2013).*

(Continued)

*Primary Examiner* — Miranda M Huang
*Assistant Examiner* — Kevin W Figueroa
(74) *Attorney, Agent, or Firm* — Stephen J. Walder, Jr.; Reza Sarbakhsh

(57) ABSTRACT

Mechanisms are provided for performing load balancing of question processing in a Question and Answer (QA) system, implemented by the data processing system, having a plurality of QA system pipelines. The mechanisms receive an input question for processing by the QA system and determine a predicted question difficulty of the input question. The mechanisms select a QA system pipeline from the plurality of QA system pipelines based on the predicted question difficulty and route the input question to the selected QA system pipeline for processing. In addition, the mechanisms process the input question with the selected QA system pipeline to generate an answer for the input question.

18 Claims, 7 Drawing Sheets

(51) Int. Cl.
    *G06N 20/00* (2019.01)
    *G06F 16/35* (2019.01)
    *G06F 16/33* (2019.01)
    *G06F 16/332* (2019.01)
    *G06N 5/04* (2006.01)

(52) U.S. Cl.
    CPC .............. *G06F 16/35* (2019.01); *G06N 5/022* (2013.01); *G06N 5/043* (2013.01); *G06N 20/00* (2019.01)

(56) References Cited

U.S. PATENT DOCUMENTS

| | | |
|---|---|---|
| 2004/0215626 A1 | 10/2004 | Colossi et al. |
| 2007/0094285 A1 | 4/2007 | Agichtein et al. |
| 2008/0162640 A1* | 7/2008 | Boss .................. G06Q 10/107 709/206 |
| 2009/0157879 A1 | 6/2009 | Stoll |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2012/0095978 A1 | 4/2012 | Levin et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2013/0171605 A1 | 7/2013 | Tang |
| 2014/0046858 A1 | 2/2014 | Werner |
| 2015/0120621 A1 | 4/2015 | Alkov et al. |
| 2016/0019280 A1 | 1/2016 | Unger et al. |

OTHER PUBLICATIONS

U.S. Appl. No. 14/067,697.

Giordani, Alessandra et al., "Generating SQL Queries Using Natural Language Syntactic Dependencies and Metadata", Department of Computer Science and Engineering, University of Trento, Via Sommarive 14, 38100 POVO (TN)—Italy, 2012, pp. 1-6.

Hao, Guo et al., "Web-Oriented Book Domain Metadata Description Research", IEEE, 2010 International Conference on Intelligent Computing and Cognitive Informatics, 2010, pp. 54-57.

High, Rob, "The Era of Cognitive Systems: An Inside Look at IBM Watson and How it Works", IBM Corporation, Redbooks, Dec. 12, 2012, 16 pages.

Liu, Jing et al., "Question Difficulty Estimation in Community Question Answering Services", Association for Computational Linguistics, Proceedings of the 2013 Conference on Empirical Methods in Natural Language Processing, Seattle, WA. Oct. 18-21, 2013, pp. 85-90.

Montgomery, Jacob M. et al., "Computerized Adaptive Testing for Public Opinion Surveys", Department of Political Science, Washington University in St. Louis, Duke University, Jun. 19, 2012, 40 pages.

Yuan, Michael J., "Watson and healthcare, How natural language processing and semantic search could revolutionize clinical decision support", IBM developerWorks, IBM Corporation, Apr. 12, 2011, 14 pages.

McCord, M.C. et al., "Deep parsing in Watson", IBM J. Res. & Dev. vol. 56 No. 3/4 Paper 3, May/Jul. 2012, pp. 3:1-3:15.

\* cited by examiner

DYNAMIC LOAD BALANCING BASED ON QUESTION DIFFICULTY

This application is a continuation of application Ser. No. 14/067,697, filed Oct. 30, 2013, status allowed.

BACKGROUND

The present application relates generally to an improved data processing apparatus and method and more specifically to mechanisms for performing dynamic load balancing based on question difficulty.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model

SUMMARY

In one illustrative embodiment, a method, in a data processing system, for performing load balancing of question processing in a Question and Answer (QA) system, implemented by the data processing system, having a plurality of QA system pipelines. The method comprises receiving, by the data processing system, an input question for processing by the QA system and determining a predicted question difficulty of the input question. The method further comprises selecting a QA system pipeline from the plurality of QA system pipelines based on the predicted question difficulty and routing the input question to the selected QA system pipeline for processing. In addition, the method comprises processing the input question by the selected QA system pipeline to generate an answer for the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
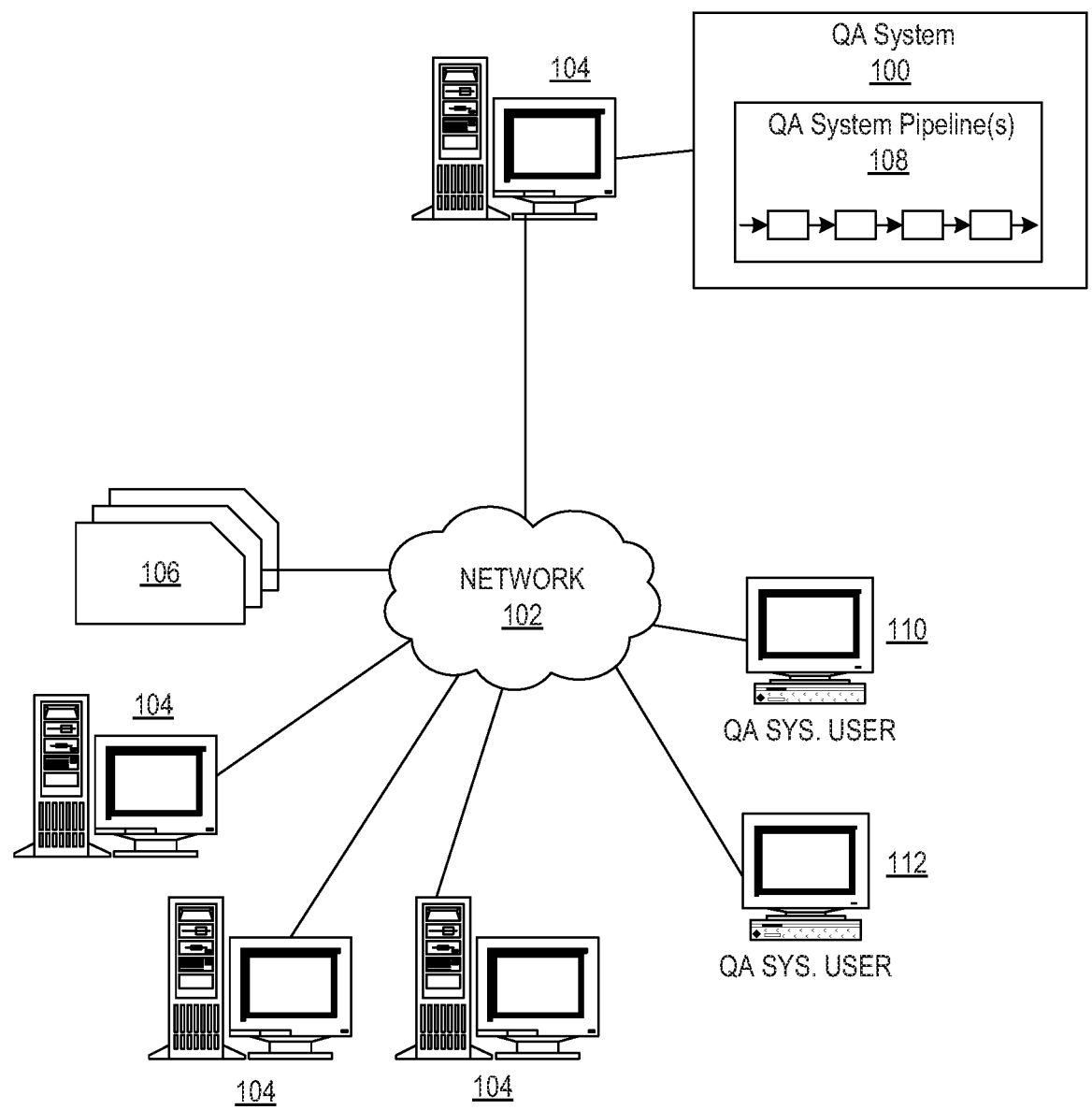
FIG. 1 depicts a schematic diagram of one illustrative embodiment of a question and answer (QA) system in a computer network.

The illustrative embodiments provide mechanisms for performing dynamic load balancing based on question difficulty. That is, through training of a Question and Answer (QA) system, comprising a plurality of QA system pipelines, each pipeline being associated with separate processors or computing devices, features of input questions are extracted and the processing load for processing each input question is determined. This information may be used to generate load balancing patterns or rules that may be used to predict the load on the QA system when subsequent input questions having similar features are processed. Based on such predictions, and the current loading of the various processors or computing devices associated with the QA system pipelines, load balancing algorithms may be utilized to cause input questions to be routed to appropriate QA system pipelines based on the predicted difficulty of processing the input question so as to balance the load across the processors or computing devices of the QA system.

Systems are typically load balanced by spreading work across various nodes, e.g., processors or computing devices, in parallel. The same technique may be used by a QA system, such as the Watson™ QA system, such that input questions may be distributed to various nodes that then answer the input questions. This technique works well for systems when the units of work all require a similar amount of time to process. However, when the units of work vary, the load balancing offered by this approach is less than optimal. With a QA system, for example, each question processed could take a vastly different amount of time to process since some questions take less or more processing cycles to arrive at an answer having a sufficiently high confidence measure. The illustrative embodiments provide a solution to such load balancing issues by taking into account the difficulty of processing the input question, as determined based on features extracted from the input question and previous training of the QA system based on question difficulty, i.e. difficulty of processing the input questions.

With the mechanisms of the illustrative embodiments, during a training phase of a QA system, as training questions are submitted to the QA system, they are analyzed and broken down to extract features of the input question. These features represent metadata of the input question including number of sentences in the question, number of words in each sentence, overall length of the question, the length of the words in the question, domain specific question artifacts (e.g., domain type (e.g., medical, insurance, or pop culture) and sub-domain type (e.g., cancer, automobile insurance, or singers), and the like. Moreover, the features may further include information regarding time requirements, resource requirements (e.g., memory usage and processor usage requirements) to extract these other features. Furthermore, the features may include semantic elements of the input question typically extracted by a QA system when analyzing the input question for purposes of generating answers to the input question, e.g., the Lexical Answer Type (LAT), the Question Classification (QClass), Question Sections (QSections), and the like. These semantic elements are used to determine what parts of the question are important for processing, the type of answer required, and restraints on the answer.

After extracting these features from the input question, the input question is submitted to the QA system pipeline for generating an answer to the input question. When the input question is submitted to the QA system pipeline, timing data and/or resource usage data is collected to determine how long and/or how much of the resources a particular question used to arrive at an answer having a confidence measure above a predetermined minimum threshold confidence measure. For purposes of the following description, it will be assumed that timing data is primarily used when determining a difficulty of a question and how to load balance questions submitted. However, as noted above, it should be appreciated that other resource usage data may be used instead of, or in addition to, this timing data to assist in predicting how difficult a question will be to answer and then perform load balancing based on this prediction.

Assuming an embodiment in which timing data is primarily utilized to identify difficulty of a question, the extracted features are correlated with this timing data to generate a pattern or rule indicating the extracted features and the resulting timing data. In some illustrative embodiments, the extracted features are correlated with timing data for a plurality of input training questions and groups of training questions having similar patterns of features are identified. From this grouping of training questions, the corresponding timing data may be used to generate a representation of a difficulty of processing questions having a similar pattern of features. The generated pattern or rule may then be applied during runtime operation (after training of the QA system has completed) to predict processing time requirements for subsequently submitted input questions. These processing time requirements are indicative of a level of difficulty of the processing of the input question. Moreover, as described hereafter, in some illustrative embodiments, a categorization of difficulty level may be assigned to questions having a particular pattern of features such that the category of difficulty may be used to predict the difficulty of the question. Based on this timing data, or indication of a general category of difficulty, load balancing may be performed amongst the various processors or computing devices, hereafter referred to collectively as "nodes", based on this predicted difficulty in generating an answer for the input question.

Thus, by learning such patterns of features in input questions and their corresponding timing data, by training the QA system, similar patterns of features may be identified in subsequent input questions and a prediction that such input questions are likely to require a similar amount of time to process the input question and generate an answer having a minimum threshold level of confidence. For example, through the learning process, a feature pattern of the type that questions with three or more words longer than 8 characters whose LAT is not "X", "Y", or "Z" (where X, Y, and Z may be different lexical answer types), and where the QClass took longer than N miliseconds to compute take 40% longer to answer than questions without these features. Such a feature pattern or rule may be generated through analysis of a plurality of correlations between extracted feature patterns and timing data for a plurality of input questions submitted to the QA system during the training phase. Moreover, the feature patterns or rules may be specific to particular domains of subject matter since the length of the processing time may be dependent on the metadata gathered in the training phase with respect to the subject matter domain. In this way, the load balancing may be tailored to the subject matter domain.

The mechanisms of the illustrative embodiments allow the QA system to perform more intelligent routing decisions about where to send a particular input question to meet throughput and overall service level agreement requirements for answering questions. Because the routing decision is made on calculated question difficulty and current system load, questions may be routed to a system that has more or less load than another. For example, system A may have three easy questions and system B may have one hard question. If a subsequent question is determined to be easy, it may be routed to system A if it is determined that time requirements for processing the combination of the easy questions in system A balances with the time for processing the single hard question in system B.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
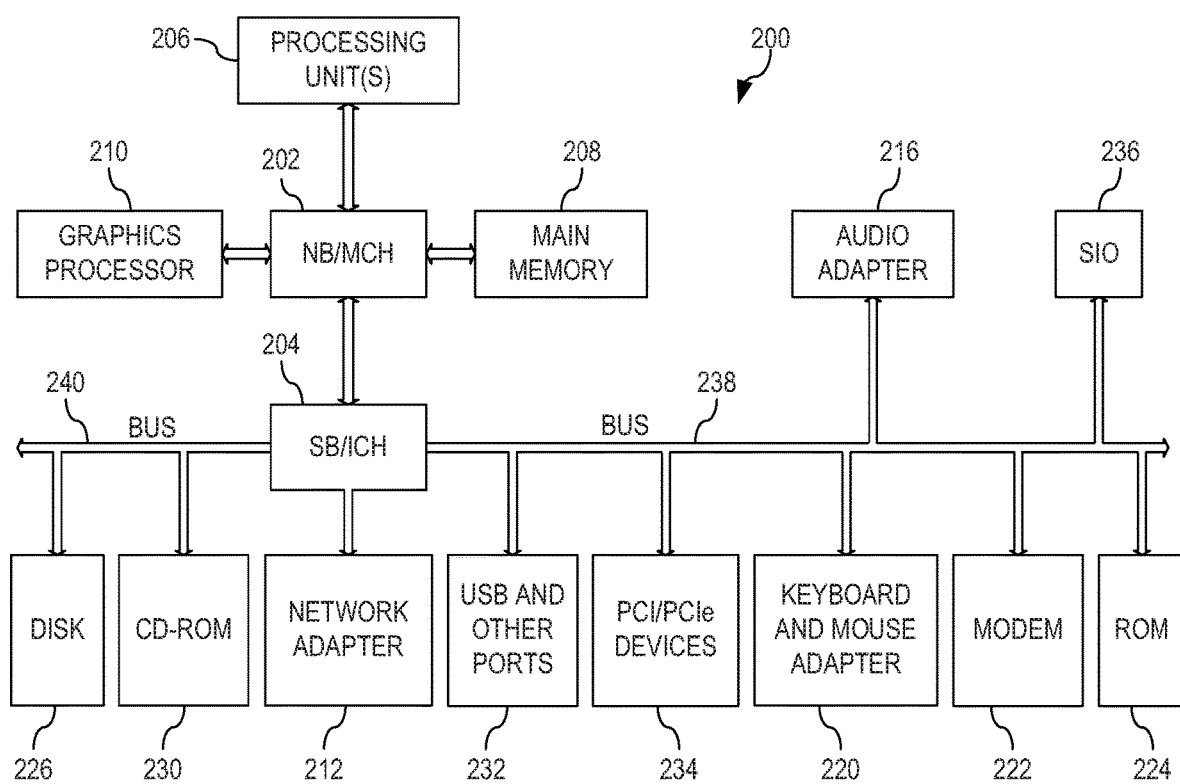
FIG. 2 is a block diagram of an example data processing system in which aspects of the illustrative embodiments may be implemented.
Figure 3:
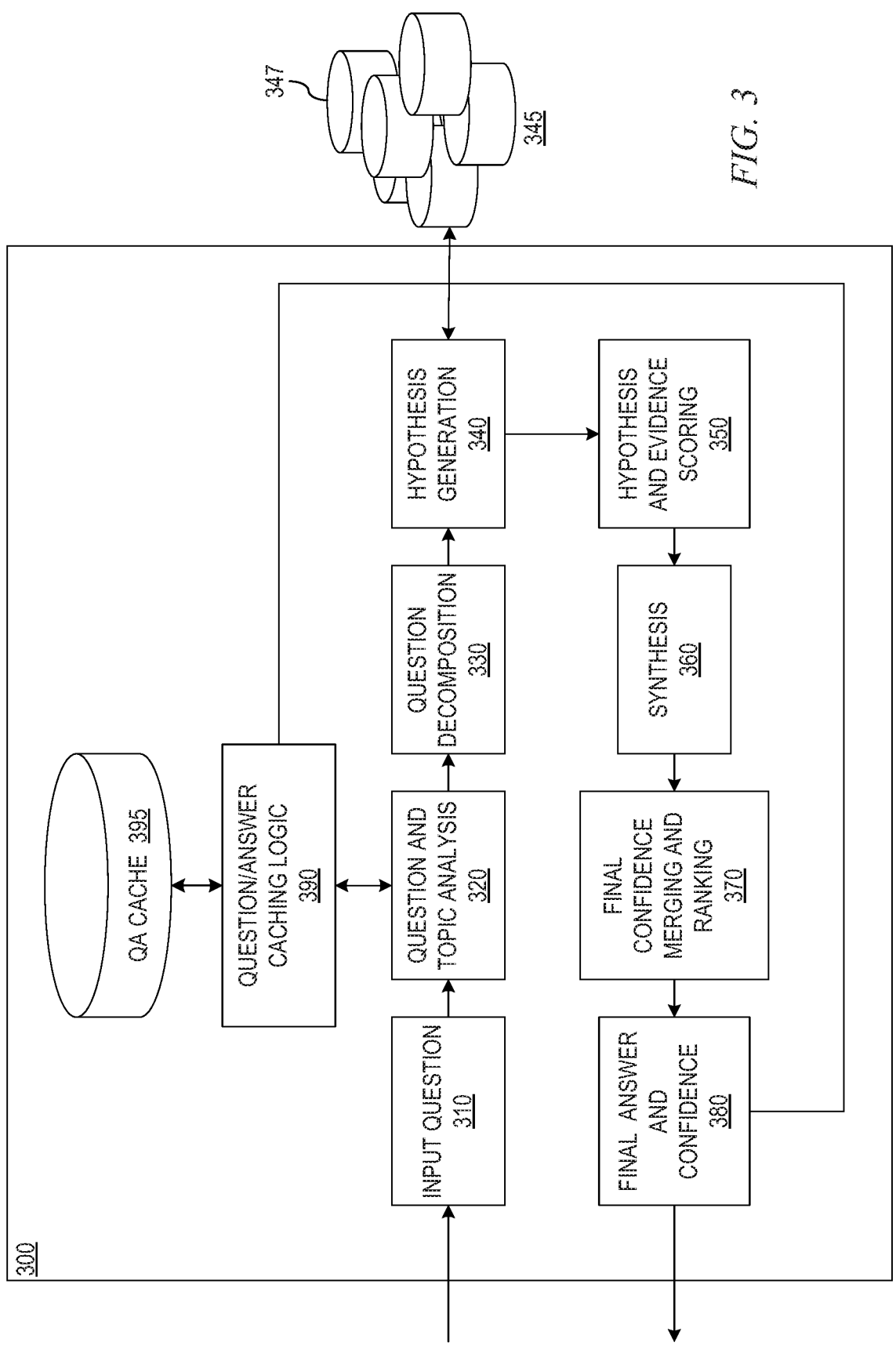
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to routing of input questions to one or more QA system pipelines of a QA system based on predictive load balancing which in turn is based on a determined question difficulty. The question difficulty is represented by a feature pattern or rule that indicates for a specific combination of features, a corresponding predicted amount of time needed to generate an answer of a minimum threshold level of confidence.

Since the mechanisms of the illustrative embodiments improve and augment a QA system, it is important to first have an understanding of how question and answer generation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time for subsequent processing of questions that are similar to questions already processed by the QA system.

FIG. 1 depicts a schematic diagram of one illustrative embodiment of a question and answer (QA) system 100 in a computer network 102. One example of a question and answer generation which may be used in conjunction with the principles described herein is described in U.S. Patent Application Publication No. 2011/0125734, which is herein incorporated by reference in its entirety. The QA system 100 may be implemented on one or morecomputing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345, or a corpus 347 within the corpora 345, in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, collections of sources, and the like, may each represent a different corpus 347 within the corpora 345. There may be a different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

In accordance with the illustrative embodiments, the QA system 100 in FIG. 1 may implement a plurality of QA system pipelines 108, such as the QA system pipeline shown in FIG. 3, for example. Each QA system pipeline 108 may be executed on a separate processor, computing device, computing system, or the like, referred to as "nodes" herein. The QA system 100 may route input questions to the various QA system pipelines 108 to balance the load of the processing of the input questions across the various QA system pipelines 108. This load balancing, in accordance with the mechanisms of the illustrative embodiments, is performed in accordance with a determined question difficulty of the input question and the current loads on the QA system pipelines 108. The determined question difficulty is based on feature patterns identified during training and a corresponding amount of time and resources used to answer questions having such feature patterns, as determined during training of the QA system 100. Thus, in order to facilitate such routing of input questions using load balancing that is based on predicted question difficulty, the mechanisms of the illustrative embodiments utilize a training phase and a runtime production system phase. Each of these phases and the primary operational components utilized during these phases will be described in greater detail hereafter with reference to FIGS. 4 and 5.

Figure 4:
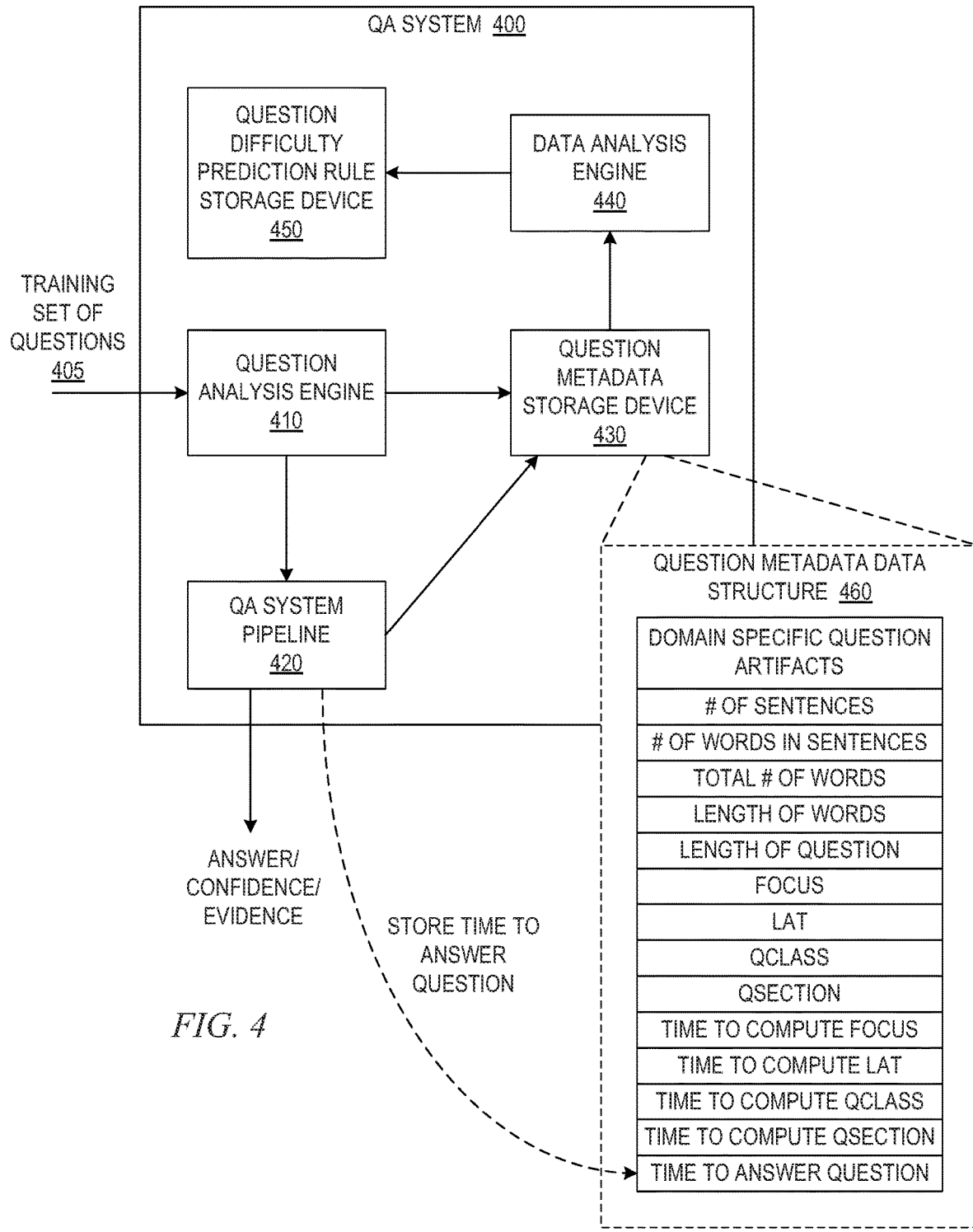
FIG. 4 is an example diagram of the primary operational components, and their operation, during a training phase of operation of a QA system in accordance with one illustrative embodiment.

FIG. 4 is an example diagram of the primary operational components, and their operation, during a training phase of operation of a QA system in accordance with one illustrative embodiment. As shown in FIG. 4, the primary operational elements of a QA system 400 used during a training phase of operation comprise a question analysis engine 410, a QA system pipeline 420, a question metadata storage device 430, a data analysis engine 440, and a question difficultly prediction rule storage device 450. The question analysis engine 410 is responsible for extracting features from an input question and store these features in a data structure associated with the input question in the question metadata storage device 430 for further analysis. The QA system pipeline 420 performs the functions as previously described above with regard to FIG. 3 to process an input question and generate an answer for the input question. In accordance with the mechanisms of the illustrative embodiments the QA system pipeline may be augmented to record a processing time required to process the input question. This may be accomplished by starting a timer when processing of the input question is initiated, or storing timestamps at the beginning and end of processing such that the difference between the timestamps may be used to determine a time for processing the input question.

The question metadata storage device 430 stores metadata data structures for questions input to the QA system. The metadata stored in the question metadata storage device 430 may be extracted from the question by the question analysis engine 410 and stored in the data structure 460. In addition, processing time data required to process the input question may be stored in the data structure by the QA system pipeline 420 once the question is processed by the QA system pipeline 420.

The data analysis engine 440 analyzes the metadata data structures 460 in the question metadata storage device 430 to identify feature patterns and related load characteristics. The feature patterns and related load characteristics may be used as a basis for defining question difficulty prediction rules that may be applied during runtime operation to predict the difficulty of answering an input question having a similar feature pattern. These question difficulty prediction rules are stored in the question difficultly prediction rule storage device 450 for later use during runtime operation.

As shown in FIG. 4, during a training phase of operation of the QA system 400, a set of training input questions 405 is used as a basis for training the QA system 400 with regard to determining question feature patterns and corresponding processing time data. The questions may be specific to a particular domain, e.g., subject matter or question classification, so as to train the QA system with regard to a specific domain. It should be appreciated that multiple training input question sets may be utilized so as to train the QA system for multiple domains. A separate set of question difficulty prediction rules may be generated for each domain in accordance with the mechanisms of the illustrative embodiments.

For a particular set of training input questions 405, the input questions are submitted to the QA system 400 and are initially processed by the question analysis engine 410. For a given input question in the set 405, the question analysis engine 410 analyzes the question to extract various features of the question for use in generating metadata describing the question being processed. In addition, the question analysis engine 410 monitors the time required to extract various ones of these features and stores this timing data along with the extracted features as part of a metadata data structure associated with the question in the question metadata storage device 430.

The types of features extracted, and timing data collected, by the question analysis engine 410 may vary depending upon the particular implementation. In one illustrative embodiment, the extracted features include domain specific question artifacts, the number of sentences in the question, the number of words in each sentence, the total number of words in the question, the length of the words or average length of the words, the overall length of the question, a focus of the question, a lexical answer type (LAT) of the question, a Question Classification (QClass) of the question, and a Question Section (QSection) of the question. Features such as the focus, LAT, QClass, and QSection are extracted by the QA system 400 during runtime operation to analyze an input question and generate queries to be applied against a corpus of documents to obtain candidate answers, and ultimately a final answer, to the input question. The focus of a question is the portion of the question that references the answer, e.g., the word "he" in the question "was he the greatest football player?" is the focus of the question indicating that a male person is the focus of the question. The LAT refers to the terms in the question that indicates what type of entity is being asked for, e.g., in the statement "he liked to write poems" the LAT is "poets". The QClass is the type the question belongs to, e.g., name, definition, category, abbreviation, number, date, etc., e.g., if the question is "who was the first President of the United States?," the QClass is a name since the question is looking for a name as the answer. The QSection refers to question fragments that require special processing and inform lexical restraints on the answer, e.g., "this 7 letter word . . . " provides a lexical restraint on the answer being a 7 letter word.

Because features such as the focus, LAT, QClass, and QSection are extracted by the QA system 400 during runtime operation when processing questions, the timing related to the extraction of these features affects the timing required to process the question and is thus, partly indicative of the question difficulty. Hence, as part of the analysis performed by the question analysis engine 410, the question analysis engine monitors the amount of time required to extract these features from the input question and records this timing data in the metadata data structure for the question stored in the question metadata storage 430. Thus, for example, the time to compute the focus, the time to compute the LAT, the time to compute the QClass, and the time to compute the QSection may be monitored and recorded, along with the extracted features, in the data structure 460 in the question metadata storage device 430.

After the initial processing of the training question by the question analysis engine 410, the training question is submitted to a QA system pipeline 420 for processing. The QA system pipeline 420 processes the training question in a normal manner, such as described above with regard to FIG. 3, with the exception that in addition to this normal manner of processing, the QA system pipeline 420 monitors the amount of time required to complete the processing of the training question. This amount of time is recorded in the metadata data structure 460 along with the other question metadata. It should be appreciated that there may be a separate question metadata data structure 460 generated for each training question submitted to the QA system 400.

These metadata data structures 460 may later be analyzed by the data analysis engine 440 to identify patterns in the features of the training questions that are indicative of predictive feature patterns in questions. That is, the feature patterns are indicative of questions that may require a substantially similar amount of time to process. By determining these feature patterns and associating them with corresponding predicted amounts of time for processing, a difficulty of questions matching the feature pattern may be identified and corresponding question difficulty prediction rules may be generated and stored in the question difficultly prediction rule storage device 450. That is, questions requiring a larger amount of time to process are more difficult to process than questions requiring relatively smaller amounts of time to process. Thus, by matching the features of an input question to feature patterns stored in question difficulty prediction rules, corresponding predicted amounts of time for processing the question may be determined and thus, an expected level of difficulty of the question may be predicted. In some illustrative embodiments, various thresholds may be established for processing times so as to classify questions into classes of difficulty, e.g., easy, medium, or hard. These classifications may be stored in conjunction with the question difficulty prediction rules and may be used during runtime to determine routing of questions, as described hereafter.

With regard to the actual identification of feature patterns within the features specified in question metadata data structures, various logic may be applied to one or more of the features in the metadata data structures to identify feature patterns. For example, logic may be employed for determining which metadata structures have an average length of words greater than 4 characters. Of those metadata data structures, a determination may be made as to which have a focus of "A". Of those, a determination may be made as to which have a LAT of "B". Of those, the average time to answer the question may be calculated. The result is a pattern indicant that for questions having a focus of A and a LAT of B, the average time to answer the question is predicted to be "X". This is but a simple example of one analysis of the metadata that may be employed. Of course the various types of the patterns that are recognizable and the types of logic employed to recognize such patterns may take many different forms depending upon the particular implementation. For example, various logic may be used to analyze a plurality of question metadata data structures to identify trends in this metadata and identify similar characteristics. For example, one embodiment may determine that a plurality of questions that took less than a particular amount of time to process were all directed to a particular domain and/or had a LAT that took more than N milliseconds to compute and/or 80% of them were less than N number of words in length, etc. Any trend analysis and characteristic similarity identification mechanism may be used without departing from the spirit and scope of the present invention.

Thus, the illustrative embodiments provide mechanisms for generating question difficulty prediction rules based on identified patterns in features extracted from training questions and corresponding times for processing these training questions. These question difficulty prediction rules are then applied, during runtime operation, to newly submitted questions to predict their difficulty and perform load balancing routing of questions to QA system pipelines based on the predicted difficulty of the question.

Figure 5:
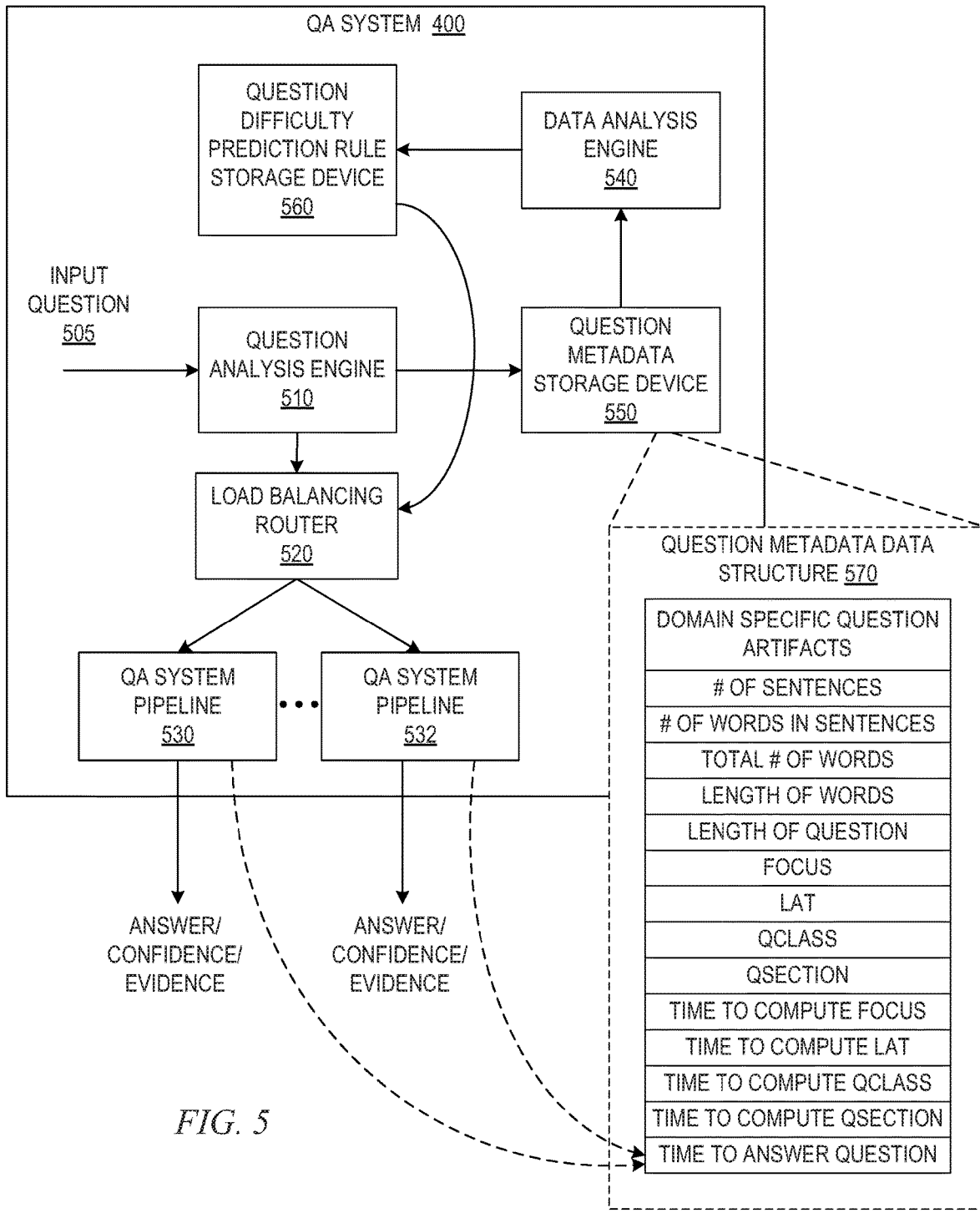
FIG. 5 is an example diagram illustrating the primary operational elements of a QA system during runtime operation using question difficulty prediction rules generated as part of a training operation in accordance with one illustrative embodiment.

FIG. 5 is an example diagram illustrating the primary operational elements of a QA system during runtime operation using question difficulty prediction rules generated as part of a training operation in accordance with one illustrative embodiment. As shown in FIG. 5, the QA system 500 comprises a question analysis engine 510, a load balancing router 520, a plurality of QA system pipelines 530-532, a data analysis engine 540, a question metadata storage device 550, and a question difficulty rule storage device 560. The elements 510, 530-532, 540, 550, and 560 operate in a similar manner to corresponding elements in FIG. 4. The primary difference in operation here, however is that there are multiple QA system pipelines available to process the input question and the load balancing router 520 performs load balancing routing of input questions to the QA system pipelines 530-532 based on current load levels of the QA system pipelines 530-532 as reported by the QA system pipelines 530-532 or otherwise determined by the load balancing router 520, and the question difficulty as determined by applying the question difficulty prediction rules to the extracted features of the input question as extracted by the question analysis engine 510.

As a further functionality, dynamic updating of the difficulty prediction rules may be made possible by again storing question metadata generated by the question analysis engine 510 during runtime operation in the question metadata storage device 550 as well as the times of processing of questions reported by the various QA system pipelines 530-532. The data analysis engine 540 may, periodically, or in response to the occurrence of a particular event, e.g., a predetermined number of questions having been process, process the metadata data structures in the question metadata storage device 550 to determine if updates to question difficulty rules are appropriate based on runtime processing of questions. Such updates may be based on the newly acquired metadata data structures generated during runtime as well as the question difficulty prediction rules generated during training, e.g., the predicted processing time may be generated as an average of the predicted processing time in the question difficulty prediction rule and the actual times of processing stored in the metadata data structures for questions having feature patterns matching the question difficulty prediction rule.

In operation, when an input question is received by the QA system 500, the question is first analyzed by the question analysis engine 510 to extract features and store these features in a metadata data structure 570 in the question metadata storage device 550. In addition the extracted features may be provided to the load balancing router 520 to perform a lookup of a question difficulty prediction rule that has a matching pattern of features to those of the input question. The matching question difficulty prediction rule, if there is one, is used to determine the level of difficulty of processing the input question and/or the predicted amount of time required to process the input question. Using this information along with current load information for the QA system pipelines 530-532, stored in current load storage device 580, the load balancing router may select a QA system pipeline 530-532 to handle processing the input question so as to balance the load across the nodes associated with the QA system pipelines 530-532. The load balancing router 520 may then route the input question to the selected QA system pipeline 530-532. Once the selected QA system pipeline 530-532 finishes processing the input question, the time required to process the input question may be stored in the metadata data structure 570 associated with the question for later analysis by the data analysis engine 540 when updating the question difficulty prediction rules.

Thus, the illustrative embodiments provide mechanisms for generating predictions of question difficulty based on patterns of features of input questions and using these predictions of question difficulty to determine load balancing routing to be applied to the input questions. Based on the determined load balancing routing, the input question may be routed to one of a plurality of QA system pipelines so as to balance the load across the nodes hosting the QA system pipelines. In this way, the load balancing helps achieve service level agreement requirements and other performance goals by providing load balancing to ensure that such requirements are able to be achieved.

Figure 6:
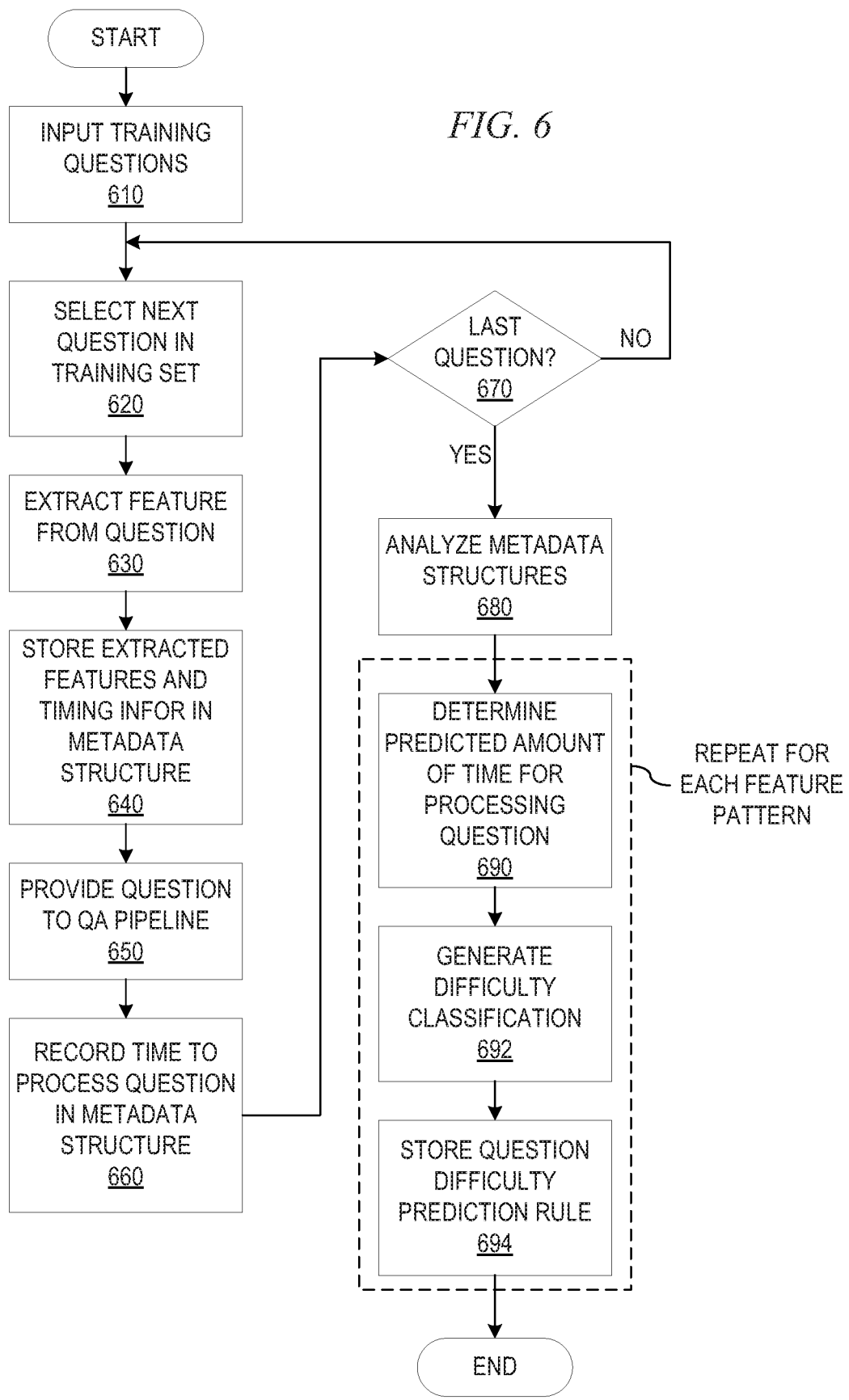
FIG. 6 is a flowchart outlining an example operation for performing question difficulty prediction training of a QA system in accordance with one illustrative embodiment.

FIG. 6 is a flowchart outlining an example operation for performing question difficulty prediction training of a QA system in accordance with one illustrative embodiment. As shown, in FIG. 6, the operation starts by inputting a set of training questions to a QA system (step 610). For the next question in the set of training questions (step 620), the question is analyzed to extract features from the question (step 630) and store the extracted features along with timing information indicating the amount of time to extract such features by the question analysis engine in a question metadata data structure (step 640). The question is provided to a QA system pipeline for processing (step 650) and the amount of time required to process the question via the QA system pipeline is recorded in the question metadata data structure (step 660).

A determination is made as to whether this was the last question in the set of training questions (step 670). If not, the operation returns to step 620 and is repeated for the next question in the set of training questions. If this was the last question in the set of training questions, then a data analysis engine analyzes the question metadata data structures for the questions in the set of training questions to identify feature patterns (step 680). For each identified feature pattern, steps 690-694 are performed. That is, the timing data in the question metadata data structures matching the feature pattern is analyzed to determine a predicted amount time for processing questions matching the feature pattern (step 690). The predicted amount of time for processing questions matching the feature pattern may then be compared against one or more thresholds of difficulty classification to generate a difficulty classification for questions matching the feature pattern (step 692). The feature pattern, predicted time for processing of questions matching the feature pattern, and the question difficulty classification may then be stored as part of a question difficulty prediction rule in a question difficulty prediction rule data structure for later use during runtime operations (step 694). Once each of the identified feature patterns is processed in this manner, the operation then terminates.

Figure 7:
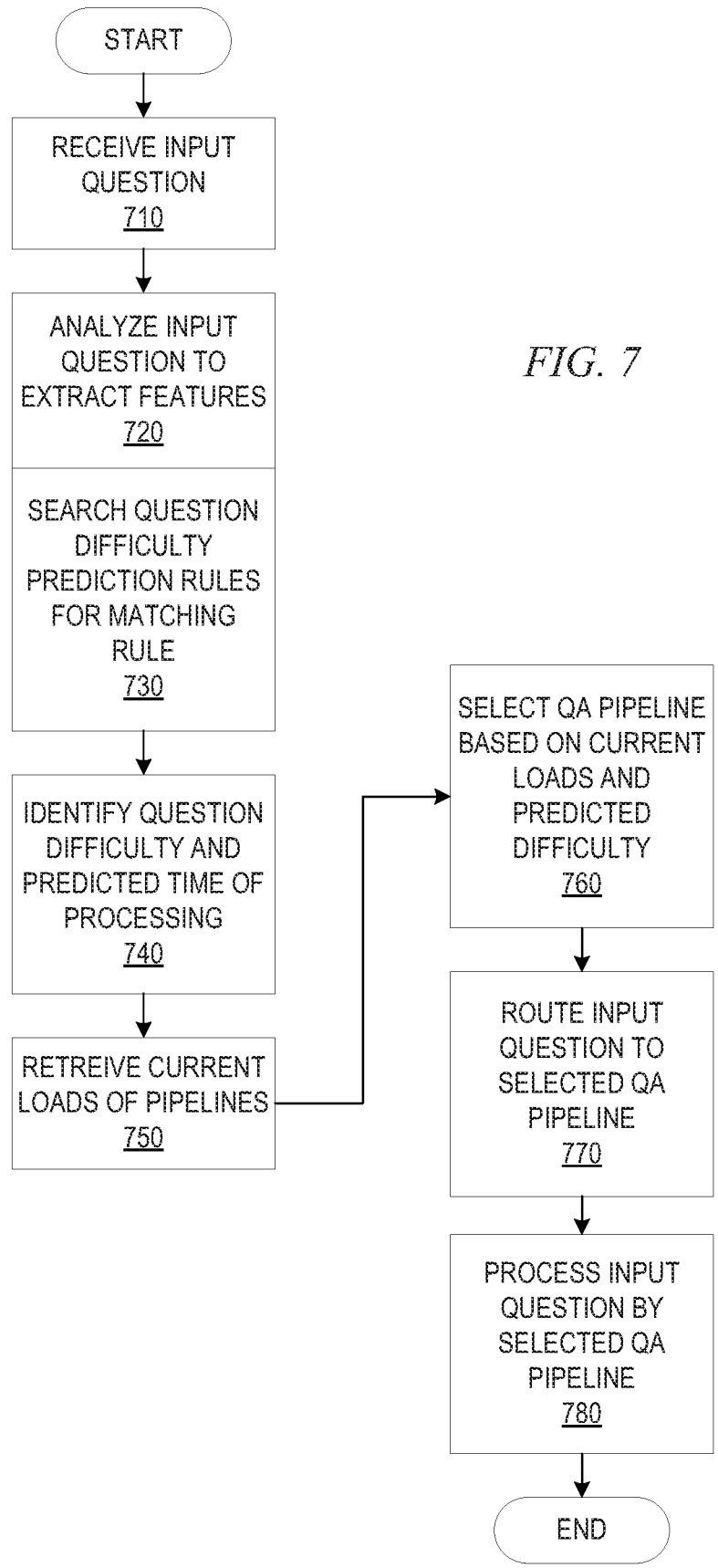
FIG. 7 is a flowchart outlining an example operation for performing runtime load balancing routing based on predicted question difficulty in accordance with one illustrative embodiment.

FIG. 7 is a flowchart outlining an example operation for performing runtime load balancing routing based on predicted question difficulty in accordance with one illustrative embodiment. As shown in FIG. 7, the operation starts by receiving, in the QA system, an input question for processing (step 710). The input question is analyzed to extract features from the input question (step 720). Based on the extracted features, a search of a question difficulty prediction rule having a pattern of features matched by the extracted features of the input question is performed (step 730). Based on the matching question difficulty prediction rule, if any, a question difficulty and time required for processing the question is identified (step 740). It should be appreciated that if a matching question difficulty prediction rule cannot be found, a default predicted difficulty may be utilized, e.g., medium difficulty.

A current load of each of a plurality of QA system pipelines is retrieved (step 750) and is used along with the predicted difficulty of the input question and/or required time of processing to select a QA system pipeline to process the input question that balances the load across the nodes hosting the plurality of QA system pipelines (step 760). The input question is then routed to the selected QA system pipeline (step 770) and the input question is thereafter processed by the selected QA system pipeline (step 780). It should be appreciated that, as previously described above, in addition to routing the input question to a selected QA system pipeline, during runtime operation a dynamic updating of the question difficulty prediction rules may be facilitated by storing the extracted feature metadata from the input question and the time actually used to process the input question by the selected QA system pipeline. This metadata may be periodically processed by the data analysis engine to perform such dynamic updating.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing an input question in a Question and Answer (QA) system, implemented by the data processing system, having a plurality of QA system pipelines, the method comprising:
   receiving, by the data processing system, an input question for processing by the QA system;
   determining, by the data processing system, a predicted question difficulty for generating an answer to the input question based on at least one feature extracted from the input question and a correlation of the at least one feature with a predicted level of question difficulty;
   selecting, by the data processing system, a QA system pipeline from the plurality of QA system pipelines based on the predicted question difficulty;
   routing, by the data processing system, the input question to the selected QA system pipeline for processing; and
   processing, by the data processing system, the input question by the selected QA system pipeline to generate an answer for the input question, wherein selecting the QA system pipeline from the plurality of QA system pipelines based on the predicted question difficulty further comprises selecting the QA system pipeline based on a current load of each of the QA system pipelines in the plurality of QA system pipelines.

2. The method of claim 1, wherein the predicted question difficulty is indicative of a predicted amount of time required to process the input question via a QA system pipeline in the plurality of QA system pipelines.

3. The method of claim 1, wherein the current load of a QA system pipeline is determined based on one or more determined levels of difficulty for one or more questions currently being processed by the QA system pipeline.

4. The method of claim 1, further comprising:
   training the QA system using training questions, wherein the training of the QA system comprises extracting features from the training questions, identifying similar features in the training questions to thereby generate one or more groups of training questions having similar features, identifying a level of difficulty of processing each of the one or more groups of training questions, and generating a rule correlating the extracted features to the identified level of difficulty; and
   storing the generated rule as a prediction rule in a prediction rule storage device, wherein determining the predicted question difficulty of the input question comprises applying stored prediction rules in the prediction rule storage device to the input features extracted from the input question to predict the level of difficulty of the input question.

5. The method of claim 1, wherein the level of difficulty of processing each of the one or more groups of training questions comprises determining the level of difficulty based on a combination of an amount of time required to extract features from a question and an amount of time required to generate an answer to the question from a corpus of data.

6. The method of claim 3, wherein the training of the QA system using training questions comprises performing domain specific training of the QA system for a plurality of domains of question subject matter.

7. The method of claim 1, wherein determining a predicted question difficulty of the input question comprises:
   extracting, from the input question, one or more features of the input question to generate one or more extracted features;
   comparing the one or more extracted features to one or more patterns of features;
   identifying a matching pattern of features based on results of the comparison of the one or more extracted features to the one or more patterns of features; and
   identifying an indicator of question difficulty corresponding to the matching pattern of features.

8. The method of claim 7, wherein the one or more extracted features comprises at least one of a number of sentences in the input question, a statistical measure of a number of words in sentences of the input question, a total number of words in the input question, a statistical measure of a length of words in the input question, a length of the input question, a focus, a lexical answer type, a question classification, or a question section.

9. The method of claim 7, wherein the indicator of question difficulty comprises at least one of a time to process questions having extracted features matching the matching pattern or a category of difficulty determined based on a time to process questions having extracted features matching the matching pattern, and wherein the time to process questions having extracted features matching the matching pattern is measured as an amount of time required to generate an answer from a corpus of data combined with one or more of a time to compute a focus of a question corresponding to the matching pattern, a time to compute a lexical answer type of a question corresponding to the matching pattern, a time to compute a question classification of a question corresponding to the matching pattern, or a time to compute a question section of a question corresponding to the matching pattern.

10. A computer program product comprising a non-transitory computer readable storage medium having a computer readable program stored therein, wherein the computer readable program, when executed on a data processing system implementing a Question and Answer (QA) system having a plurality of QA system pipelines, causes the data processing system to:
  receive an input question for processing by the QA system;
  determine a predicted question difficulty for generating an answer to the input question based on at least one feature extracted from the input question and a correlation of the at least one feature with a predicted level of question difficulty;
  select a QA system pipeline from the plurality of QA system pipelines based on the predicted question difficulty;
  route the input question to the selected QA system pipeline for processing; and
  process the input question by the selected QA system pipeline to generate an answer for the input question, wherein the computer readable program further causes the data processing system to select the QA system pipeline from the plurality of QA system pipelines based on the predicted question difficulty further at least by selecting the QA system pipeline based on a current load of each of the QA system pipelines in the plurality of QA system pipelines.

11. The computer program product of claim 10, wherein the predicted question difficulty is indicative of a predicted amount of time required to process the input question via a QA system pipeline in the plurality of QA system pipelines.

12. The computer program product of claim 10, wherein the current load of a QA system pipeline is determined based on one or more determined levels of difficulty for one or more questions currently being processed by the QA system pipeline.

13. The computer program product of claim 10, wherein the computer readable program further causes the data processing system to:
  train the QA system using training questions, wherein the training of the QA system comprises extracting features from the training questions, identifying similar features in the training questions to thereby generate one or more groups of training questions having similar features, identifying a level of difficulty of processing each of the one or more groups of training questions, and generating a rule correlating the extracted features to the identified level of difficulty; and
  store the generated rule as a prediction rule in a prediction rule storage device, wherein determining the predicted question difficulty of the input question comprises applying stored prediction rules in the prediction rule storage device to the input features extracted from the input question to predict the level of difficulty of the input question.

14. The computer program product of claim 10, wherein the level of difficulty of processing each of the one or more groups of training questions comprises determining the level of difficulty based on a combination of an amount of time required to extract features from a question and an amount of time required to generate an answer to the question from a corpus of data.

15. The computer program product of claim 12, wherein the computer readable program further causes the data processing system to train the QA system using training questions at least by performing domain specific training of the QA system for a plurality of domains of question subject matter.

16. The computer program product of claim 10, wherein the computer readable program further causes the data processing system to determine a predicted question difficulty of the input question at least by:
  extracting, from the input question, one or more features of the input question to generate one or more extracted features;
  comparing the one or more extracted features to one or more patterns of features;
  identifying a matching pattern of features based on results of the comparison of the one or more extracted features to the one or more patterns of features; and
  identifying an indicator of question difficulty corresponding to the matching pattern of features.

17. The computer program product of claim 16, wherein the indicator of question difficulty comprises at least one of a time to process questions having extracted features matching the matching pattern or a category of difficulty determined based on a time to process questions having extracted features matching the matching pattern, and wherein the time to process questions having extracted features matching the matching pattern is measured as an amount of time required to generate an answer from a corpus of data combined with one or more of a time to compute a focus of a question corresponding to the matching pattern, a time to compute a lexical answer type of a question corresponding to the matching pattern, a time to compute a question classification of a question corresponding to the matching pattern, or a time to compute a question section of a question corresponding to the matching pattern.

18. A data processing system comprising:
  a processor; and
  a memory coupled to the processor, wherein the memory comprises instructions which, when executed by the processor, cause the processor to:
  receive an input question for processing by a Question and Answer (QA) system;
  determine a predicted question difficulty for generating an answer to the input question based on at least one feature extracted from the input question and a correlation of the at least one feature with a predicted level of question difficulty;
  select a QA system pipeline from a plurality of QA system pipelines based on the predicted question difficulty;
  route the input question to the selected QA system pipeline for processing; and
  process the input question by the selected QA system pipeline to generate an answer for the input question, wherein the instructions further cause the processor to select the QA system pipeline from the plurality of QA system pipelines based on the predicted question difficulty further at least by selecting the QA system pipeline based on a current load of each of the QA system pipelines in the plurality of QA system pipelines.

* * * * *